March 26, 1968  J. F. COPLIN  3,374,624
GAS TURBINE ENGINE COMBUSTION EQUIPMENT
Filed Aug. 29, 1966  2 Sheets-Sheet 1
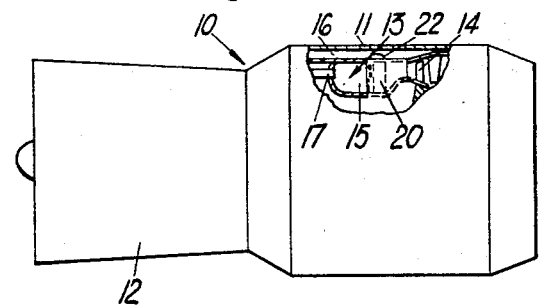
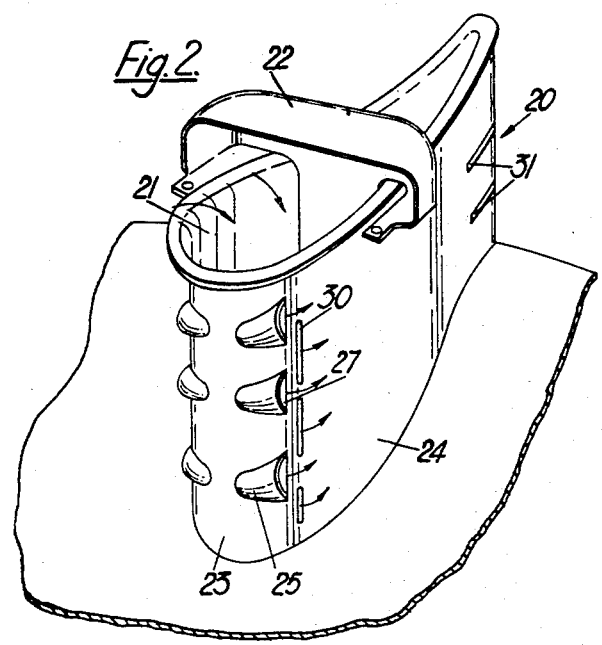
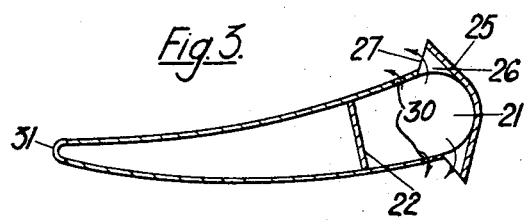

March 26, 1968 J. F. COPLIN 3,374,624
GAS TURBINE ENGINE COMBUSTION EQUIPMENT
Filed Aug. 29, 1966 2 Sheets-Sheet 2
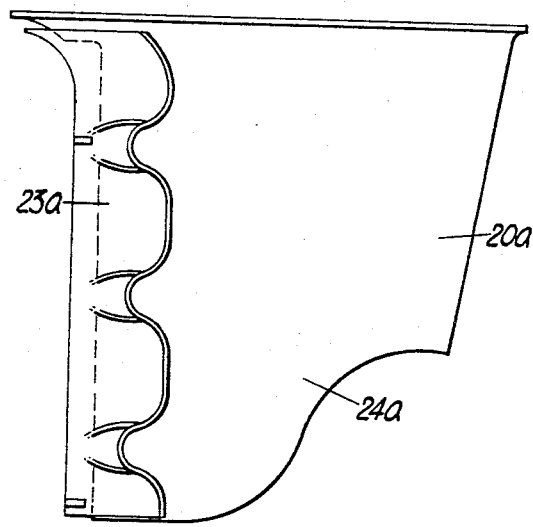
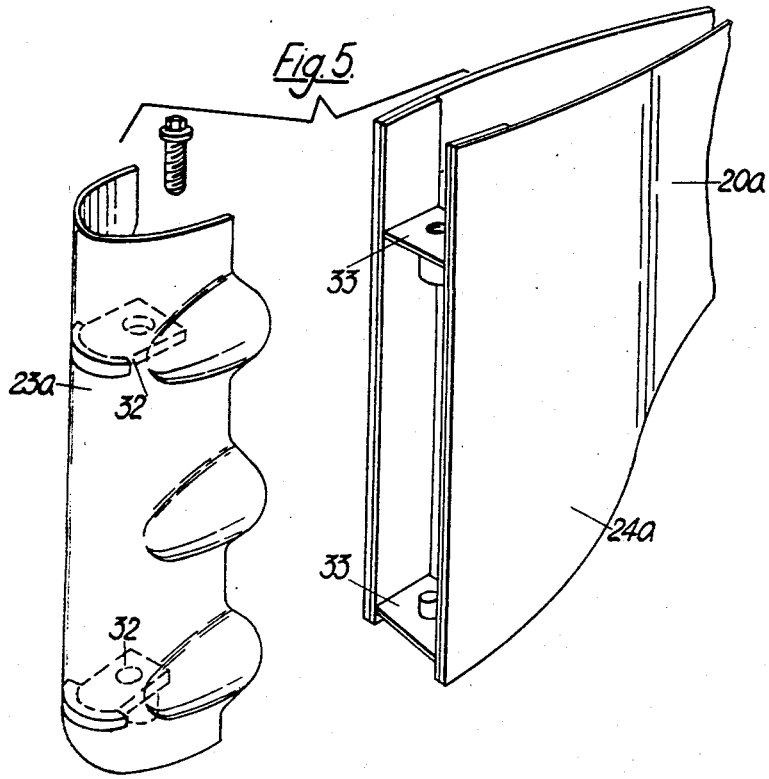

United States Patent Office 3,374,624
Patented Mar. 26, 1968

3,374,624
GAS TURBINE ENGINE COMBUSTION
EQUIPMENT
John Frederick Coplin, Littleover, Derby, England, assignor to Rolls-Royce Limited, Derby, England, a British company
Filed Aug. 29, 1966, Ser. No. 575,844
Claims priority, application Great Britain,
Sept. 9, 1965, 38,604/65
3 Claims. (Cl. 60—39.65)

ABSTRACT OF THE DISCLOSURE

The invention concerns a gas turbine combustion chamber having a flame tube, a plurality of axially relatively long nozzle guide vanes mounted within and extending radially completely across the flame tube. Each nozzle guide vane is hollow and is arranged to receive dilution air. Adjacent the leading edge of each guide vane a plurality of raised integral baffles are provided which serve to deflect dilution air non-axially from the interior of the nozzle guide vane via apertures provided under each baffle.

---

This invention relates to combustion equipment for a gas turbine engine.

According to the present invention, there is provided a gas turbine engine combustion chamber comprising an outer casing, a flame tube mounted within the outer casing and spaced therefrom, an axially extending dilution air duct which is adapted to be supplied with dilution air and which extends alongside the flame tube, an axially extending primary combustion air duct for delivering primary combustion air to the upstream end of the flame tube, and a plurality of angularly spaced apart nozzle guide vanes which are mounted within and extend radially completely across the flame tube, each nozzle guide vane having a passage therein communicating with the dilution air duct, and the wall of each nozzle vane having adjacent its leading edge a plurality of non-axially facing apertures therein which communicate with the said passage, and a plurality of arcuate raised portions secured to each said nozzle guide vane adjacent the leading edge thereof, each raised portion communicating with a said aperture to ensure that the dilution air which passes from the said passage and through the said apertures is directed to a downstream and non-axial direction to mix with the combustion gases flowing through the flame tube, the major portion of the dilution air supplied to the said passage passing through the said apertures.

The said wall portion may be integral with the remaining part of the wall of the nozzle guide vanes. Alternatively, the said wall portion may be separate from but secured to the remaining part of the wall of the nozzle guide vane.

Each nozzle guide vane may be provided at each of its opposite sides with slits for the flow therethrough of dilution air from the said slits and said apertures being radially off-set from each other.

Each nozzle guide vane may, moreover, have at least one aperture at its trailing edge for the flow therethrough of dilution air from the said passage.

Each nozzle guide vane may also be provided with a scoop for directing air from the dilution air duct into the respective said passage.

The invention also comprises a gas turbine engine provided with a combustion chamber as set forth above.

The invention is illustrated, merely by way of example, in the accompanying drawings, in which:

FIGURE 1 is a diagrammatic view, partly in section, of a gas turbine engine having a combustion chamber in accordance with the present invention, FIGURE 2 is a broken-away perspective view of a nozzle guide vane forming part of the combustion chamber shown in FIGURE 1, FIGURE 3 is a cross section through the nozzle guide vane of FIGURE 2, FIGURE 4 is a sectional elevation of a modified nozzle guide vane which may be used in the combustion chamber of the engine of FIGURE 1, and FIGURE 5 is a broken-away exploded perspective view of the nozzle guide vane of FIGURE 4.

In FIGURE 1 there is shown a gas turbine engine 10 having an outer casing 11, the engine being provided in flow series with a compressor 12, a combustion chamber 13 and a turbine 14.

The combustion chamber 13 comprises an annular flame tube 15 which is mounted within the outer casing 11 and which is spaced therefrom by an axially extending dilution air duct 16. The dilution air duct 16, which is adapted to be supplied with dilution air from the compressor 12, extends alongside the flame tube 15. The dilution air duct 16 is provided radially outwardly of an axially extending primary combustion air duct 17 through which combustion air is delivered from the compressor 12 to the upstream end of the flame tube 15.

Mounted within and extending radially completely across the flame tube 15 are a plurality of angularly spaced apart nozzle guide vanes 20. Each of the nozzle guide vanes 20 is hollow, having a passage 21 therein which communicates with the dilution air duct 16. Each nozzle guide vane has a scoop 22 for directing air from the dilution air duct 16 into the passage 21.

Each of the nozzle guide vanes 20 has, adjacent to its leading edge, wall portion 23 which is integral with the remaining part 24 of the wall of the nozzle guide vane 20. The wall portion 23 has a plurality of corrugations or raised portions 25 (e.g. three, as shown) on each of its opposite sides, the corrugations 25 forming baffles. The interior 26 of each corrugation 25 communicates at its upstream end with the passage 21 and at its downstream end with a non-axially facing aperture 27, the latter being disposed within the flame tube 15 and spaced from the downstream end thereof. The major portion of the dilution air which is supplied to the passage 21 passes out of the apertures 27 and is directed by the wall portion 23 in a downstream direction to mix with the combustion gases flowing through the flame tube 15. The dilution air, however, is directed downstream by the wall portion 23 with a component of velocity in a non-axial direction, so as to promote the said mixing.

Each of the nozzle guide vanes 20 has, immediately downstream of its apertures 27, a series of slits 30 for the flow therethrough of dilution air from the passage 21. The slits 30 are aligned with each other in the same radial plane but are off-set radially from the apertures 27. Each nozzle guide vane may, moreover, be provided with one or more further series of slits 30 (not shown), the various series of slits being arranged successively downstream of each other.

Each nozzle guide vane 20 is also provided at its trailing edge with apertures 31 for the flow therethrough of dilution air from the passage 21.

The slits 30 provide air for the sheet cooling of the sides of nozzle guide vanes 20 and some of the air from the apertures 27 also performs this same purpose.

In FIGURES 4 and 5, there is shown a modification of the invention which employs nozzle guide vanes 20a. Each nozzle guide vane 20a has a wall portion 23a which is separate from the remaining part 24a of the nozzle guide vane, but which is connected thereto by the bolting of internal flanges 32 in the wall portion 23a to internal flanges 33 in the remaining part 24a.

If desired, each of the nozzle guide vanes 20, 20a may have a flattened leading edge (not shown) and a channel (not shown) may be formed on the external side thereof for the passage of cooling air therethrough.

I claim:

1. A gas turbine engine combustion chamber comprising an outer casing, a flame tube mounted within the outer casing and spaced therefrom, an axially extending dilution air duct which is adapted to be supplied with dilution air and which extends alongside the flame tube, an axially extending primary combustion air duct for delivering primary combustion air to the upstream end of the flame tube, and a plurality of angularly spaced-apart nozzle guide vanes which are mounted within and extend radially completely across the flame tube, each nozzle guide vane having a passage therein communicating with the dilution air duct, and the wall of each nozzle guide vane having adjacent its leading edge a plurality of non-axially facing apertures therein which communicate with the said passage, and a plurality of arcuate raised portions secured to each said nozzle guide vane adjacent the leading edge thereof, each raised portion communicating with a said aperture to ensure that the dilution air which passes from the said passage and through the said apertures is directed in a downstream and non-axial direction to mix with the combustion gases flowing through the flame tube, the major portion of the dilution air supplied to the said passage passing through the said apertures.

2. A combustion chamber as claimed in claim 1 in which each nozzle guide vane is provided at each of its opposite sides with slits for the flow therethrough of dilution air from the said passage, said slits and said apertures being radially off-set from each other.

3. A combustion chamber as claimed in claim 1 in which each nozzle guide vane has a scoop secured thereto for directing air from the dilution air duct into the respective said passage.

References Cited

UNITED STATES PATENTS

| | | | |
|---|---|---|---|
| 2,664,702 | 1/1954 | Lloyd et al. | 60—39.65 |
| 2,811,832 | 11/1957 | Flanigen et al. | 60—39.65 |
| 2,840,989 | 7/1958 | Macaulay | 60—39.65 |
| 3,316,714 | 5/1967 | Smith et al. | 60—39.65 |

JULIUS E. WEST, *Primary Examiner.*